G. B. BASSETT.
WATER METER.
APPLICATION FILED NOV. 4, 1908.

1,077,116.

Patented Oct. 28, 1913.

Witnesses
Charles K. Bassett
Chas. M. Harrington

Inventor
George B Bassett

UNITED STATES PATENT OFFICE.

GEORGE B. BASSETT, OF BUFFALO, NEW YORK.

WATER-METER.

1,077,116.   Specification of Letters Patent.   Patented Oct. 28, 1913.

Application filed November 4, 1908. Serial No. 460,986.

*To all whom it may concern:*

Be it known that I, GEORGE B. BASSETT, a citizen of the United States, residing at Buffalo, in the county of Erie and State of New York, have invented a new and useful Water-Meter, of which the following is a specification, reference being had to the drawings accompanying and forming a part thereof.

My invention relates to meters for measuring the ordinary and the extraordinary flows of water in pipes.

The principal object of my present invention is to provide a meter for measuring and registering all ordinary flows of water through a pipe and which will also pass dirt, sticks, and stones, and measure all extraordinary flows of water through the pipe with the least possible obstruction to the current by automatically opening the current way and automatically registering the increased flows.

Other objects are to improve the construction and arrangement of these meters for the purpose of reducing the cost of manufacture, allowing the more ready assemblage, separation, and adjustment of parts, increasing the efficiency and durability, and giving other advantageous results.

I attain these objects by the mechanism illustrated in the accompanying drawings, in which—

Figure 1:
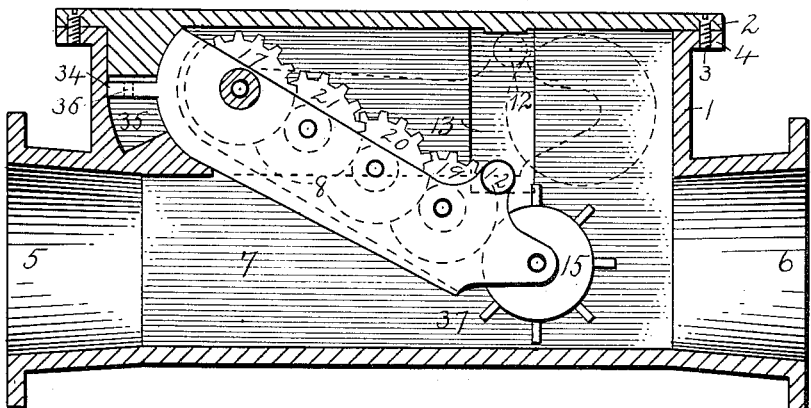
Figure 2:
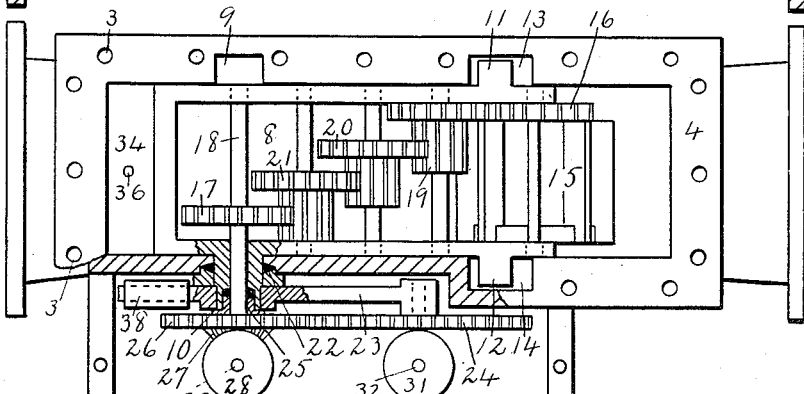
Figure 3:
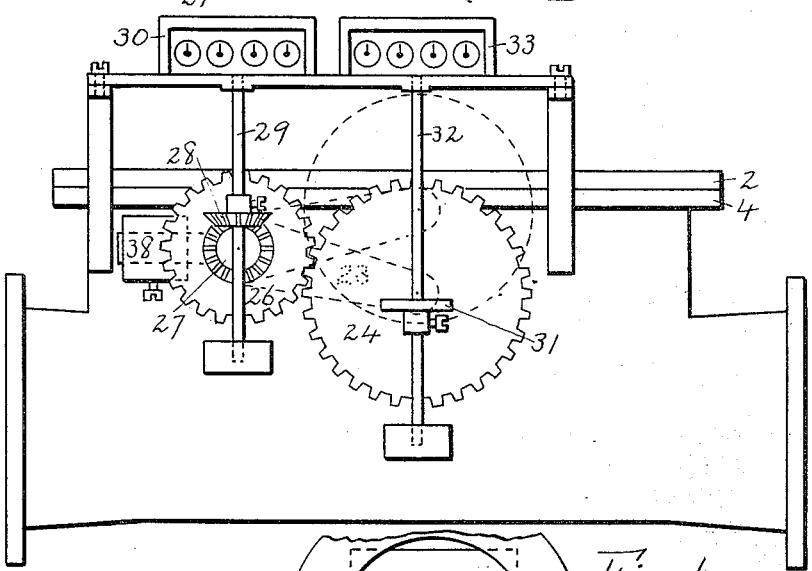
Figure 4:
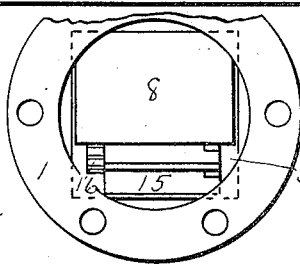

Figure 1 is a vertical longitudinal section of the outside case of the meter showing the submerged working parts in position. Fig. 2 is a top view of the meter with the cover and indicators removed; Fig. 3 is a side elevation of the meter showing the indicators and their connecting gearing; Fig. 4 is an end view of the inlet opening to the meter showing how the current way changes from a circular to a rectangular section.

Similar numerals refer to similar parts throughout the several views.

1 is the main outside case of the meter which is provided with a cover 2 securely fastened to same by screws passing through holes 3 in flange 4. Water inlet opening 5 and water outlet opening 6 are circular and are connected by rectangular current way 7 which has substantially parallel sides and is substantially equal in area to circular inlet 5 and outlet 6 and in which is hung swinging valve 8 by trunnions 9 and 10 resting in bearings formed in the sides of outer case 1. The maximum arc through which valve 8 may swing is limited by projections 11 and 12 formed on its sides striking the top and bottom of recesses 13 and 14 formed in the sides of outer case 1. On the free end of swing valve 8 is mounted current measuring wheel 15 and its toothed wheel 16. Concentric with the center about which valve 8 swings is toothed gear 17 rigidly mounted on stuffing box shaft 18. On the top of swing valve 8 are mounted intermediate toothed wheel reducing gears and pinions 19, 20, and 21, which transmit the motion of current measuring wheel 15 and its toothed gear 16 to gear 17 and its stuffing box shaft 18. Trunnion 10 passes through stuffing box 22 to the outside of case 1 and on the outer end of same is rigidly and adjustably mounted swinging lever 23 which carries on one of its free ends friction spur toothed wheel 24 which thus rises and falls with swinging valve 8. Stuffing box shaft 18 passes through stuffing box 25 in trunnion 10 and on the outer end of same is rigidly mounted spur toothed wheel 26 and beveled toothed wheel 27. Beveled toothed wheel 27 meshes with register beveled toothed wheel 28 which is rigidly mounted on register shaft 29 which operates the ordinary register 30 which is thus positively connected with and positively registers the number of turns current measuring wheel 15 makes during any given period of time. Spur toothed wheel 26 meshes with and operates friction spur toothed wheel 24 against the side of which is pressed friction register wheel 31 which is rigidly mounted on register shaft 32 which operates actual register 33.

On swinging valve 8 is formed the projection 34 which acts as an oscillating cushioning piston in the hydraulic cushioning chamber 35 formed in outer case 1.

36 is a small opening through which the cushioning liquid passes from one side of the piston to the other slowly so as to prevent the sudden rising and falling or clattering of swinging valve 8.

38 is an adjustable counter weight that may be moved back and forth on lever 23 to counterbalance in part swinging valve 8 and its attachments.

In operation, the water enters the meter at inlet opening 5 and passes thence along rectangular current way 7 and under swinging valve 8 operating current measuring wheel 15 at a speed proportionate to the speed of the water through the variable opening 37 between the bottom of current way 7 and the under side of the free end of swinging valve 8. At all ordinary flows, this will be constant as the weight of swinging valve 8 will keep it at its lowest position which is that shown by the full lines in the drawings. Both registers are set to equally register this constant or ordinary flow. Should an extraordinary flow of water pass through the meter, it will raise swinging valve 8 and swinging arm 23 with its friction spur wheel 24, thus causing register friction wheel 31 to travel farther, operating actual register 33 proportionately faster. Register 33 would show the actual amount of water that passed through the meter, while the difference between the amount indicated by ordinary register 30 and actual register 33 would show approximately the amount used for extraordinary purposes.

The maximum height of swinging valve 8 is shown by dotted lines in Fig. 1; and the corresponding maximum height of swinging arm 23 and its spur toothed friction wheel 24 is shown by dotted lines in Fig. 3.

From the foregoing description, it will be obvious to persons skilled in the art that modifications may be made in details of construction of my improved water meter without departing from the spirit or principles of my invention and that some of the improvements described may be used without the others.

Having thus described my invention, what I claim and desire to secure by Letters Patent, is—

1. In a water meter, the combination with an inlet and an outlet in axial alinement and a straight current way connecting said inlet and said outlet, a measuring wheel and means to automatically expand and contract the area of said current way mounted together in said current way, of a register and means operated by said wheel and said first mentioned means so as to automatically adapt the speed of said register to correspond with both the variable area of said current way and the variable speed of the water through said current way, substantially as and for the purpose described.

2. In a water meter, the combination with an inlet and an outlet in axial alinement and a straight current way connecting said inlet and said outlet, a measuring wheel and means to automatically expand and contract the area of said current way mounted together in said current way, a register and means operated by said wheel which registers the speed of said wheel, of a second register and means operated by said wheel and said first mentioned means so as to automatically adapt the speed of said second register to register the full flow of the water due to both the variable area of said current way and the variable speed of the water through said current way, substantially as and for the purpose described.

3. In a water meter, the combination with a current way, a measuring wheel and means to automatically expand and contract the area of said current way mounted together in said current way, of a register and means operated by said wheel and said first mentioned means so as to automatically adapt the speed of said register to correspond with both the variable area of said current way and the variable speed of the water through said current way, substantially as and for the purpose described.

4. In a water meter, the combination with a current way, a measuring wheel and means to automatically expand and contract the area of said current way mounted together in said current way, a register and means operated by said wheel which registers the speed of said wheel, of a second register and means operated by said wheel and said first mentioned means so as to automatically adapt the speed of said second register to register the full flow of the water due to both the variable area of said current way and the variable speed of the water through said current way, substantially as and for the purpose described.

5. In a water meter, the combination with a current way, a measuring wheel and means to automatically expand and contract the area of said current way mounted together in said current way, a register and positive gearing whereby said register registers the speed of said wheel of a second register and a variable friction drive driven by said gearing and automatically adjustable by said means so as to register the full flow of the water, substantially as and for the purpose described.

6. In a water meter, the combination with a current way and a swinging valve for regulating the area of the current way, of a current measuring wheel and a cushioning device for said valve both mounted on said valve, substantially as and for the purpose described.

7. In a water meter, the combination with a current way, and a submerged current measuring wheel and means of mounting same so that it automatically rises or falls as the flow of water increases or decreases, of a cushioning device that prevents said wheel or means for mounting same from clattering, substantially as and for the purpose described.

8. In a water meter, the combination with a current way and a swinging valve for automatically expanding and contracting the current way, of a current measuring wheel mounted on the free end of said valve, substantially as and for the purpose described.

9. In a water meter the combination with a current way, a swinging valve for automatically expanding and contracting the area of the current way, a submerged current measuring wheel mounted on the free end of said swinging valve, a supporting trunnion for said swinging valve and a toothed gear and stuffing box shaft mounted in said supporting trunnion of said swinging valve, of intermediate gearing mounted on said valve for transmitting the motion of said measuring wheel to said shaft, substantially as and for the purpose described.

10. In a water meter, the combination with a current way, a swinging valve for automatically expanding and contracting the area of said current way, a submerged current measuring wheel mounted on the free end of said swinging valve, a stuffing box in the meter case, a supporting trunnion of said swinging valve extended through said stuffing box to the outside of the meter case, a stuffing box formed in said trunnion, a stuffing box shaft extending through said stuffing box formed in said trunnion, of a register and means of transmitting the motion of said shaft to said register, substantially as and for the purpose described.

11. In a water meter, the combination with a current way, a swinging valve for automatically expanding and contracting the area of said current way, a submerged current measuring wheel mounted on the free end of said valve, and a register, of means to automatically adapt the speed of said register to correspond with both the speed of said current measuring wheel and the position of said valve, substantially as and for the purpose described.

12. In a water meter, the combination with a swinging valve and a submerged measuring wheel attached to said valve, of projections formed on said valve to limit the arc through which it may swing, substantially as and for the purpose described.

13. A water meter comprising a current way, a valve adapted to automatically expand and contract the area of said current way, a current measuring wheel mounted on said valve, a register, and means for operating said register by both said wheel and said valve.

14. A water meter comprising a current way, a swinging valve adapted to automatically expand and contract the area of said current way, a current measuring wheel mounted on said valve, a register, and means for operating said register by both said wheel and said valve.

15. A water meter comprising a current way, a swinging valve adapted to automatically expand and contract the area of said current way, a current measuring wheel mounted on the free end of said valve, a register, and means for operating said register by both said wheel and said valve.

16. A water meter comprising a current way, with two substantially parallel sides, a swinging valve adapted to rise and fall between said sides and expand and contract the area of said current way, a current measuring wheel mounted on said valve, a register, and means for operating said register by both said valve and said wheel.

17. A water meter comprising a current way, a swinging valve adapted to automatically expand and contract the area of said current way, a current measuring wheel mounted on said valve, a hydraulic cushioning device mounted on said valve to prevent said valve clattering, a register and means for operating said register by both said valve and said wheel.

18. A water meter comprising a current way, a swinging valve adapted to automatically expand and contract the area of said current way, a measuring wheel mounted on said valve, projections formed on said valve to limit the extent of its movement, a register and means for operating said register by both said valve and said wheel.

19. A water meter comprising a current way, a swinging valve adapted to automatically expand and contract the area of said current way, a measuring wheel mounted on said valve, a hydraulic cushioning device mounted on said valve to prevent said valve clattering, projections formed on said valve to limit the extent of its movement, a register and means for operating said register by both said valve and said wheel.

In testimony whereof I have signed this specification in the presence of two subscribing witnesses.

GEORGE B. BASSETT.

Witnesses:
CHARLES K. BASSETT,
CHAS. M. HARRINGTON.